US011427718B2

(12) United States Patent
Ellson et al.

(10) Patent No.: US 11,427,718 B2
(45) Date of Patent: Aug. 30, 2022

(54) VAT RESIN WITH ADDITIVES FOR THIOURETHANE POLYMER STEREOLITHOGRAPHY PRINTING

(71) Applicants: Board of Regents, The University of Texas System, Austin, TX (US); Adaptive 3D Technologies, Dallas, TX (US)

(72) Inventors: Gregory T. Ellson, Dallas, TX (US); Benjamin R. Lund, Wylie, TX (US); Walter Voit, Dallas, TX (US)

(73) Assignees: Board of Regents, The University of Texas System, Austin, TX (US); Adaptive 3D Technologies, Dallas, TX (US)

( * ) Notice: Subject to any disclaimer, the term of this patent is extended or adjusted under 35 U.S.C. 154(b) by 552 days.

(21) Appl. No.: 16/170,342

(22) Filed: Oct. 25, 2018

(65) Prior Publication Data

US 2019/0127596 A1 May 2, 2019

Related U.S. Application Data

(60) Provisional application No. 62/578,169, filed on Oct. 27, 2017.

(51) Int. Cl.
*C09D 11/101* (2014.01)
*C09D 11/102* (2014.01)
(Continued)

(52) U.S. Cl.
CPC .......... *C09D 11/101* (2013.01); *B29C 64/124* (2017.08); *B33Y 10/00* (2014.12);
(Continued)

(58) Field of Classification Search
None
See application file for complete search history.

(56) References Cited

U.S. PATENT DOCUMENTS 4,837,260 A * 6/1989 Sato .................... A61B 5/1172
523/212
5,679,756 A 10/1997 Zhu et al.
(Continued)

FOREIGN PATENT DOCUMENTS

EP 2270114 A1 1/2011
EP 2368875 A1 9/2011

OTHER PUBLICATIONS

Arnold, et al.; "Recent Advances in Isocyanate Chemistry"; Jackson Laboratory, E.I. du Pont de Nemours & Company, May 25, 1956; pp. 47-76.
(Continued)

*Primary Examiner* — Mohammad M Ameen

(57) ABSTRACT

A vat resin for three-dimensional stereolithography printing of a thiourethane polymer part comprising a liquid mixture including a first type of monomer, a second type of monomer, a photolatent base decomposable upon exposure to a light to form a non-nucleophillic base catalyst having a pKa greater than 7, an anionic step-growth polymerization reaction inhibitor having an acidic group configured to form an acid-base pair with the non-nucleophillic base and a light absorber having an absorbance in the liquid mixture that is greater than an absorbance of the photolatent base at a wavelength of the light used for the exposure. Methods of preparing the vat resin and three-dimensional stereolithography printing a thiourethane polymer part using the vat resin are also disclosed.

16 Claims, 4 Drawing Sheets

Figure 1:
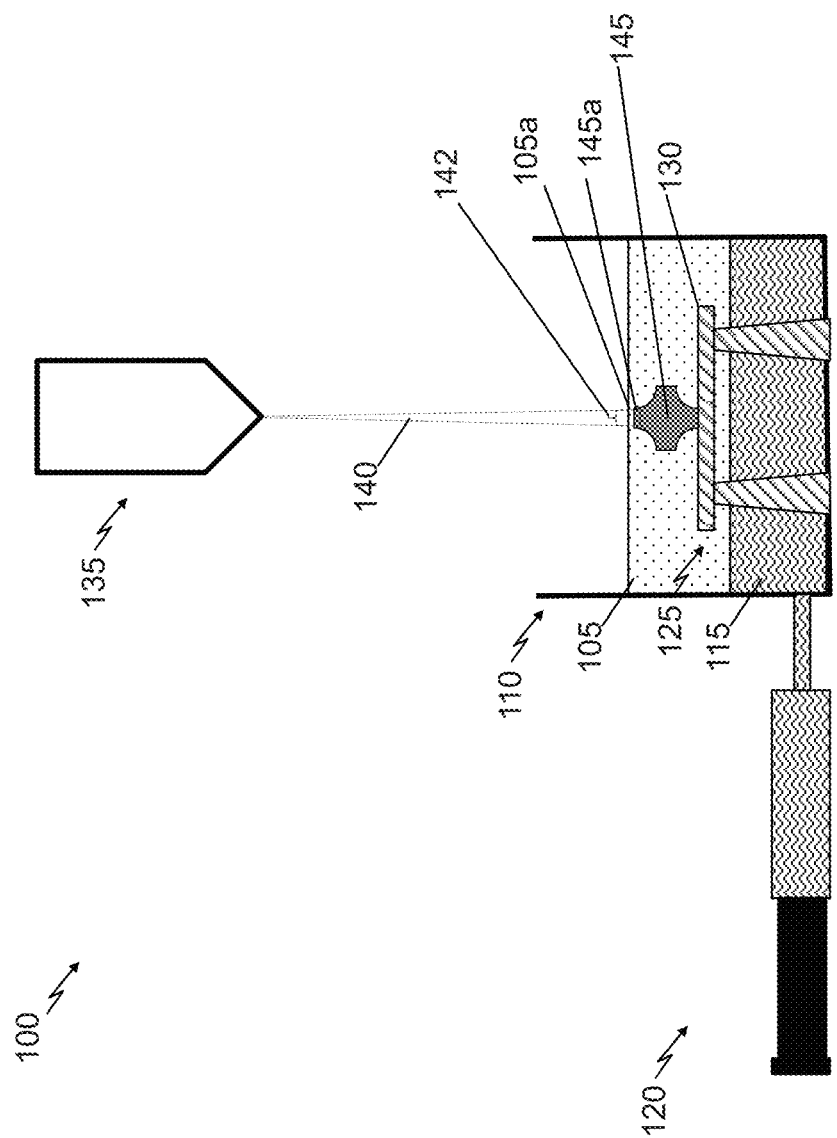

(51) Int. Cl.

| | |
|---|---|
| *C09D 11/033* | (2014.01) |
| *C08G 18/38* | (2006.01) |
| *C08G 18/08* | (2006.01) |
| *B33Y 10/00* | (2015.01) |
| *B33Y 70/00* | (2020.01) |
| *B29C 64/124* | (2017.01) |
| *C08G 18/73* | (2006.01) |
| *C08G 18/76* | (2006.01) |
| *C08G 18/72* | (2006.01) |
| *C08G 18/75* | (2006.01) |
| *C08G 18/79* | (2006.01) |
| *C08G 18/20* | (2006.01) |
| *B29K 75/00* | (2006.01) |

(52) U.S. Cl.
CPC ............ *B33Y 70/00* (2014.12); *C08G 18/089* (2013.01); *C08G 18/2063* (2013.01); *C08G 18/3876* (2013.01); *C08G 18/725* (2013.01); *C08G 18/73* (2013.01); *C08G 18/752* (2013.01); *C08G 18/755* (2013.01); *C08G 18/758* (2013.01); *C08G 18/7614* (2013.01); *C08G 18/7621* (2013.01); *C08G 18/7642* (2013.01); *C08G 18/7671* (2013.01); *C08G 18/792* (2013.01); *C09D 11/033* (2013.01); *C09D 11/102* (2013.01); *B29K 2075/00* (2013.01)

(56) References Cited

U.S. PATENT DOCUMENTS

| | | | | |
|---|---|---|---|---|
| 9,334,430 | B1* | 5/2016 | Stevenson | C09J 135/02 |
| 9,777,097 | B2* | 10/2017 | Liu | C08F 226/02 |
| 9,902,860 | B1* | 2/2018 | Li | C09D 11/101 |
| 2003/0212164 | A1* | 11/2003 | Klinkenberg | C08K 5/0008 522/173 |
| 2008/0269050 | A1* | 10/2008 | Azizian | G01N 31/229 503/217 |
| 2016/0340374 | A1* | 11/2016 | Sakai | C07C 279/04 |

OTHER PUBLICATIONS

Kolb, et al.; "Click Chemistry: Diverse Chemical Function from a Few Good Reactions"; Angew. Chem. Int. Ed.; Wiley-VCH Verlag GmbH, D-69451 Weinheim; 2001; 18 pgs.

Hoyle, et al.; "Thiol-click chemistry: a multifaceted toolbox for small molecule and polymer synthesis"; Chemical Society Reviews; The Royal Society of Chemistry; www.rsc.org/csr; Sep. 4, 2009; 34 pgs.

Hensarling, et al.; "Thiol-isocyanate "click" reactions: rapid development of functional polymeric surfaces"; Polymer Chemistry; The Royal Society of Chemistry; www.rsc.org/polymers; Sep. 7, 2010; 4 pgs.

Li, et al.; "The Thiol-Isocyanate click Reaction: Facile and Quantitative Access to w-End-Functional Poly (N,N-diethylacrylamide) Synatesized by RAFT Radical Polymerization"; Macromolecules; May 18, 2009; pp. 6537-6542.

De, et al.; "Efficient synthesis of multifunctional polymers via thiol-epoxy "click" chemistry"; ChemCom; The Royal Society of Chemistry; www.rsc.org/chemcomm; Jan. 18, 2012; pp. 3130-3132.

Dyer, et al.; "The Kinetics of the Reactions of Phenyl Isocyanate with Thiols"; Department of Chemistry, University of Delaware; col. 26; Oct. 24, 1960; pp. 2919-2925.

Matsushima, et al.; "Thiol-Isocyanate-Acrylate Ternary Networks by Selective Thiol-Click Chemistry"; Wiley InterScience; www.interscience.wiley.com; Journal of Polymer Science: Part A: Polymer Chemistry, vol. 48; Feb. 2, 2010; pp. 3255-3264.

Shin, et al.; "Segmented Polythiourethane Elastomers through Sequential Thiol-Ene and Thiol-Isocyanate Reactions"; Macromolecules vol. 42; American Chemical Society; Nov. 25, 2008; pp. 3294-3301.

Shin, et al.; "Thiol-Isocyanate-Ene Ternary Networks by Sequential and Simultaneous Thiol Click Reactions"; Chemistry of Materials, vol. 22, No. 8; American Chemical Society; pubs.acs.org/cm; Dec. 25, 2009; pp. 2616-2625.

Nakayama, et al.; "Synthesis of novel UV-curable difunctional thiourethane methacrylate and studies on organic-inorganic nanocomposite hard coatings for high refractive index plastic lenses"; Elsevier; www.elsevier.com/locate/porgcoat; Oct. 29, 2007; 11 pgs.

Hoyle, et al.; "Thiol-Enes: Chemistry of the Past with Promise for the Future"; Wiley InterScience; www.interscience.wiley.com; J. Polym. Sci. Part A: Polym.Chem: vol. 42; Jun. 8, 2004; pp. 5301-5338.

Carioscia, et al.; "Evaluation and control of thiol-ene/chiol-epoxy hybrid networks"; ScienceDirect; Elsevier; www.elsevier.com/locate/polymer; Aug. 9, 2006; 7 pgs.

Dietliker, et al.; "Advancements in photoinitiators—Opening up new applications for radiation curing"; Elsevier; www.elsevier.com/locate/porgcoat; Jun. 2, 2006; 12 pgs.

Katogi, et al.; "Photobase Generation from Amineimide Derivatives and Their Use for Curing an Epoxide/Thiol System"; R&D Center, Hitachi Chemical Co., Ltd.; Nov. 21, 2001; pp. 4045-4052.

Sangermano, et al.; "Photolatent amines producing a strong base as photocatalyst for the in-situ preparation of organic-inorganic hybrid coatings"; Elsevier; www.elsevier.com/locate/polymer; Polymer; Jan. 23, 2014; 8 pgs.

Seubert, et al.; "Epoxy thiol photolatent base clearcoats: curing and formulation"; J. Coat. Technolo. Res., 7(5); 2010; pp. 615-622.

Suyama, et al.; "Photobase generators: Recent progress and application trend in polymer systems"; Elsevier; www.elsevier.com/locate/ppolysci; Progress in Polymer Science; Mar. 1, 2008; 16 pgs.

Li, et al.; "Study on synthesis and photoactivity of N-substituted diazabicyclononane derivatives with different substituents"; Elsevier; www.elsevier.com/locate/ijadhadh; International Journal of Adhesion & Adhesives; Nov. 20, 2014; 7 pgs.

Sarker, et al.; "Tetraorganylborate salts as convenient precursors for photogeneration of tertiary amines"; J. Chem. Soc., Perkin Trans. 2; Jan. 16, 1998; pp. 2315-2321.

Sarker, et al.; "Photoinduced Electron-Transfer Reactions: Highly Efficient Cleavage of C—N Bonds and Photogeneration of Tertiary Amines"; J. Phys. Chem. A; American Chemical Society; Sep. 2, 1997; pp. 5375-5382.

Sarker, et al.; "Synthesis of Tetraorganylborate Salts: Photogeneration of Tertiary Amines"; Center for Photochemical Sciences, Bowling Green State University; Chem. Mater. col. 13, No. 11; American Chemical Society; May 22, 2001; pp. 3949-3953.

Zhang, et al.; "Visible-Light-Initiated Thiol-Michael Addition Polymerizations with Coumarin-Based Photobase Generators: Another Photoclick Reaction Strategy"; ACS Macro Letters; pubs.acs.org/macroletters; American Chemical Society; Dec. 15, 2015; pp. 229-233.

Tachi, et al.; "Photolysis of Quaternary Ammonium Dithiocarbamates and Their Use as Photobase Generators"; Journal of Photopolymer Science and Technology, vol. 13, No. 1; Apr. 3, 2000; pp. 153-156.

Tsunooka, et al.; "Stability of Quaternary Ammonium Salts in Various Solvents and Their Use as Photobase Generators"; Journal of Photopolymer Science and Technology, vol. 14, No. 2; Apr. 1, 2001; pp. 153-154.

Tachi, et al.; "Photochemical Reactions of Quaternary Ammonium Dithiocarbamates as Photobase Generators and Their Use in the Photoinitiated Thermal Crosslinking of Poly(glycidylmethacrylate)"; Department of Applied Chemistry, Graduate School of Engineering, Osaka Prefecture University; Journal of Polymer Science: Part A: Polymer Chemistry, vol. 39; Nov. 6, 2000; pp. 1329-1341.

Tsunooka, et al.; "Photocuring Systems Using Quaternary Ammonium Thiocyanates"; Journal of Photopolymer Science and Technology, vol. 15, No. 1; Mar. 27, 2002; pp. 47-50.

Suyama, et al.; "Photo- and Thermochemical Behavior of Quaternary Ammonium Thiocyanates and Their Use as Crosslinkers"; Journal of Photopolymer Science and Technology, vol. 16, No. 1; Mar. 31, 2003; pp. 83-86.

Suyama, et al.; "Photochemical formation of ammonium/thiolate complexes from quaternary ammonium thiocyanates and its use in

(56) References Cited

OTHER PUBLICATIONS crosslinking of polymers"; Journal of Photochemistry and Photobiology A: Chemistry; Elsevier; www.elsevier.com/locate/jphotochem; May 14, 2005; 8 pgs.

Suyama, et al.; "Effect of Anions on Photoreactivity and Stability of Quaternary Ammonium Salts as Photobase Generators"; Journal of Photopolymer Science and Technology, vol. 17, No. 1; Mar. 29, 2004; pp. 15-18.

Suyama, et al.; "Quaternary Ammonium Salt as DBU—Generating Photobase Generator"; Journal of Photopolymer Science and Technology, vol. 19, No. 1; 2006; 4 pgs.

Salmi, et al.; "Polythiourethane networks catalyzed by photobase generators"; Progress in Organic Coatings; Elsevier; www.elsevier.com/locate/porgcoat; Jan. 16, 2016; 5 pgs.

Gibson, et al.; "Additive Manufacturing Technologies"; Rapid Prototyping to Direct Digital Manufacturing; Springer; Additive Manufacturing Technologies; 2010; 472 pgs.

Huang, et al.; "Additive manufacturing and its societal impact: a literature review"; Int J Adv Manuf Technol; Springer; May 6, 2012; 13 pgs.

Kruth, et al.; "Progress in Additive Manufacturing and Rapid Prototyping"; Keynote Papers; Annals of the CIRP, vol. 47/2/1998; 1998; pp. 525-540.

Yakacki, et al.; "Deformation Limits in Shape-Memory Polymers"; Advanced Engineering Materials; DOI: 10.1002/adem.200700184; http://www.aem-journal.com; 2008; pp. 112-119.

Safranski, et al.; "Effect of chemical structure and crosslinking density on the thermo-mechanical properties and toughness of (meth)acrylate shape memory polymer networks"; Polymer; Elsevier; www.elsevier.com/locate/polymer; May 4, 2008; 10 pgs.

Neo, et al.; "A New Model and Measurement Technique for Dynamic Shrinkage during Photopolymerization of Multi-Acrylates"; Macromolecular Rapid Communications; www.mrc-journal.de; Feb. 28, 2005; pp. 1008-1013.

Stansbury, et al.; "Conversion-dependent shrinkage stress and strain in dental resins and composites"; dental materials; Elsevier; www.intl.elsevierhealth.com/journals/dema; 2005; 12 pgs.

"CE 221 is a high performance material with excellent strength, stiffness, and temperature resistance (231 degrees C)"; CarbonResin CE 221; Doc #103474 Rev D; Technical Data Sheet; Aug. 14, 2017; 3 pgs.

"EPU 40 is a high performance polyurethane elastomer that is a good choice for applications where high elasticity and tear resistance are needed"; CarbonResin EPU 40; Doc #103208 Rev E; Technical Data Sheet; Aug. 15, 2018; 3 pgs.

"RPU 60 is a tough, abrasion-resistant material that is a good choice for parts that require rigidity, strength, and durability"; CarbonResin RPU 60; Doc #103211 Rev C; Technical Data Sheet; Aug. 14, 2017; 3 pgs.

"FPU 50 is an impact, abrasion and fatigue resistant semi-rigid material that is a good choice for parts that must withstand repetitive stresses such as living hinges or friction fits"; CarbonResin FPU 50; Doc #103215 Rev C; Technical Data Sheet; Aug. 14, 2017; 3 pgs.

Tumbleston, et al.; "Continuous liquid interface production of 3D objects"; Additive Manufacturing; Science, vol. 347, Issue 6228; sciencemag.org; Mar. 20, 2015; 5 pgs.

\* cited by examiner

VAT RESIN WITH ADDITIVES FOR THIOURETHANE POLYMER STEREOLITHOGRAPHY PRINTING

CROSS-REFERENCE TO RELATED APPLICATION

This application claims the benefit of U.S. Provisional Application Ser. No. 62/578,169, filed by Gregory T. Ellson, et al. on Oct. 27, 2017, entitled "A VAT RESIN WITH ADDITIVES FOR THIOURETHANE POLYMER STEREOLITHOGRAPHY PRINTING," commonly assigned with this application and incorporated herein by reference.

TECHNICAL FIELD

This application is directed, in general, to a vat resin for three-dimensional stereolithography printing of a thiourethane polymer as well as methods of preparing the vat resin and three-dimensional stereolithography printing a thiourethane polymer part using the resin.

BACKGROUND

Stereolithography (SLA) is a well-established additive manufacturing process for forming three-dimensional (3D) parts. Photopolymer resins used for SLA printing are often formulated for use with acrylate chemistry. The wide commercial and synthetic availability of acrylate monomers allows for relatively cheap and rapid printing and the addition of resin additives such as radical and oxygen inhibitors to control the free radical initiated chain-growth polymerization mechanism associated with polyacrylate formation.

However, SLA printed acrylic polymers can be brittle, thereby limiting their use for some structural applications. SLA printed acrylic polymers can shrink during curing, resulting curing stresses when combined with the early gelation at low conversion that is inherited for the polyacrylate chain-growth polymerization mechanism. Curing stresses in fully cured polyacrylates can cause undesired shape deformations in the final printed part. Secondary chemistries, such as epoxies, polyurethanes, and cyanate ester chemistries, have been attempted to improve toughness and mechanical performance, but often at the cost of requiring extended thermal post-cure times before achieving mechanical stability.

Therefore, there is a need to develop alternative polymer systems for SLA printing where the printed polymer can undergo rapid curing but has reduced cure stresses and improved mechanical properties.

SUMMARY

One aspect of the disclosure is a vat resin for three-dimensional stereolithography printing of a thiourethane polymer part comprising a liquid mixture. The liquid mixture includes a first type of monomer, a second type of monomer, and a photolatent base. The first type of monomer includes two or more thiol functional groups, the second type of monomer includes two or more isocyanate functional groups. The photolatent base decomposes upon exposure to a light to form a non-nucleophillic base catalyst having a pKa greater than 7. The liquid mixture includes an anionic step-growth polymerization reaction inhibitor having an acidic group configured to form an acid-base pair with the non-nucleophillic base. The liquid mixture include a light absorber having an absorbance in the liquid mixture that is greater than an absorbance of the photolatent base at a wavelength of the light used for the exposure.

Another aspect of the disclosure is method of preparing a vat resin for three-dimensional stereolithography printing a thiourethane polymer part. The method comprises forming a liquid mixture. Forming the liquid mixture includes combining a first type of monomer and a second type of monomer, to form a monomer mixture, wherein the first type of monomer includes two or more thiol functional groups and the second type of monomer includes two or more isocyanate functional groups. Forming the liquid mixture also includes adding an anionic step-growth polymerization reaction inhibitor to the monomer mixture, the inhibitor having an acidic group configured to form an acid-base pair with the non-nucleophillic base. Forming the liquid mixture also includes adding a photolatent base to the monomer mixture, the photolatent base being decomposable upon exposure to a light to form a non-nucleophillic base catalyst having a pKa greater than 7. Forming the liquid mixture also includes adding a light absorber having an absorbance in the liquid mixture that is greater than an absorbance of the photolatent base at a wavelength of the light used for the exposure.

Another aspect of the disclosure is method of three-dimensional stereolithography printing a thiourethane polymer part. The method includes adding a resin to a vat of a three-dimensional stereolithography printer. The resin is a liquid mixture that includes the first type of monomer, the second type of monomer, the photolatent base and the light absorber.

BRIEF DESCRIPTION

Figure 2:
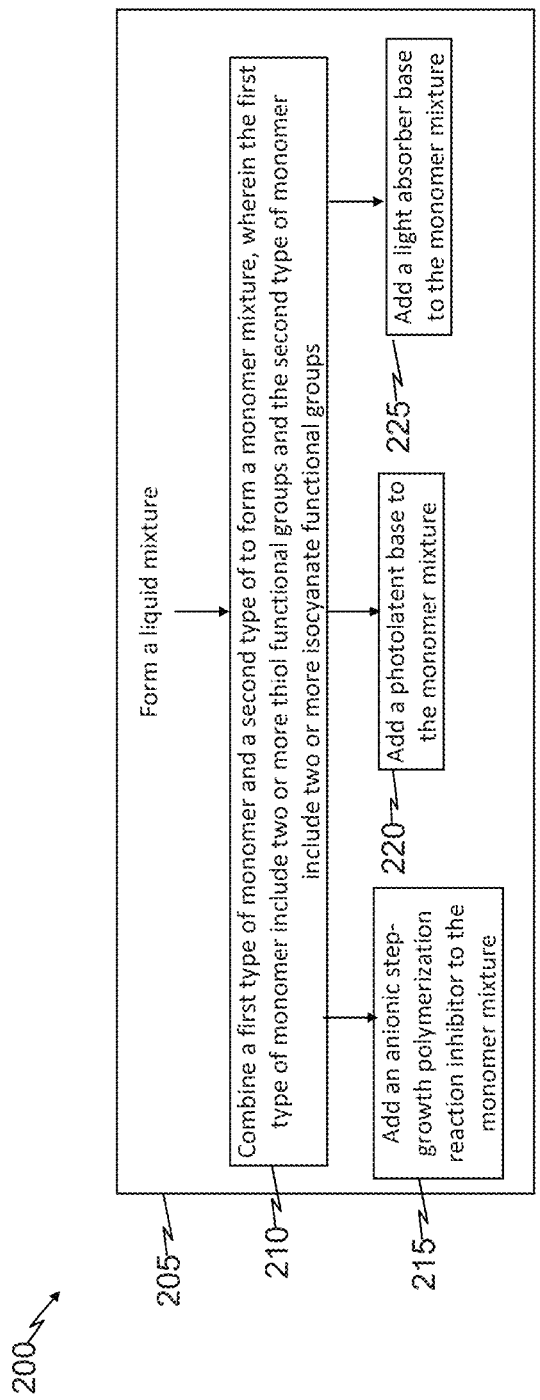
Figure 3:
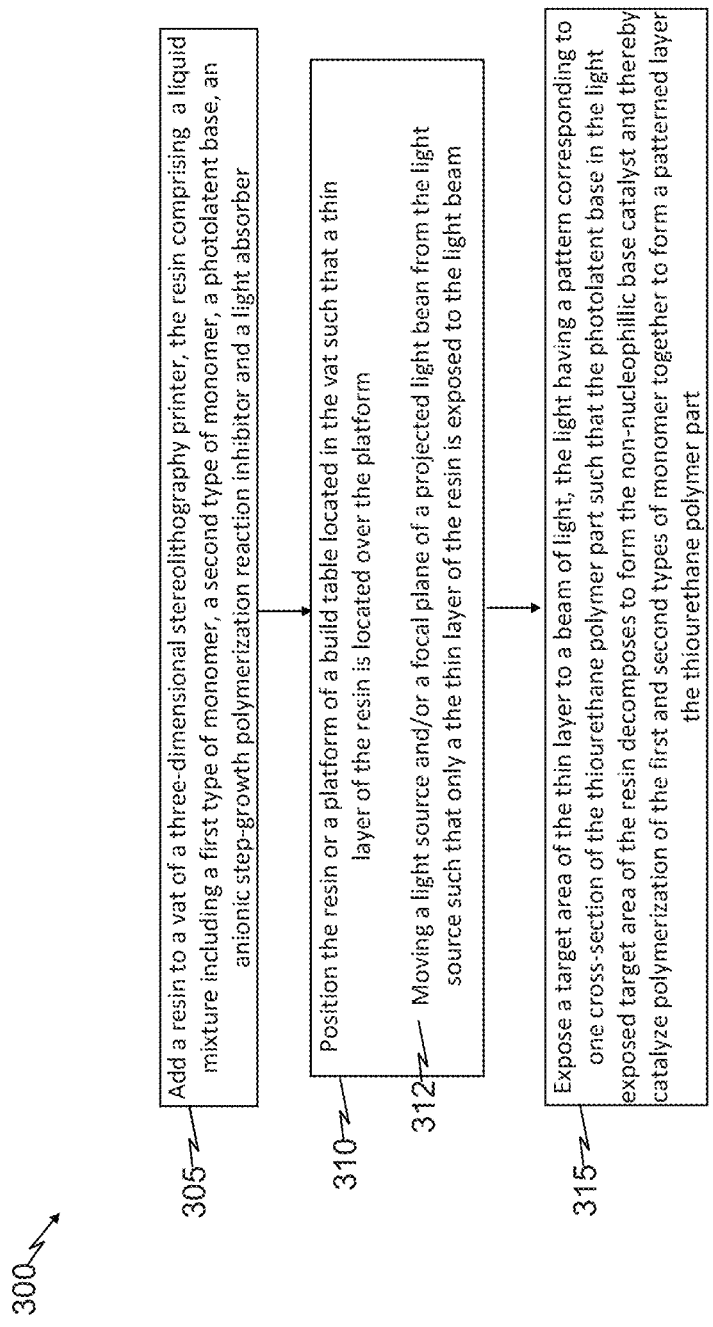
Figure 4:
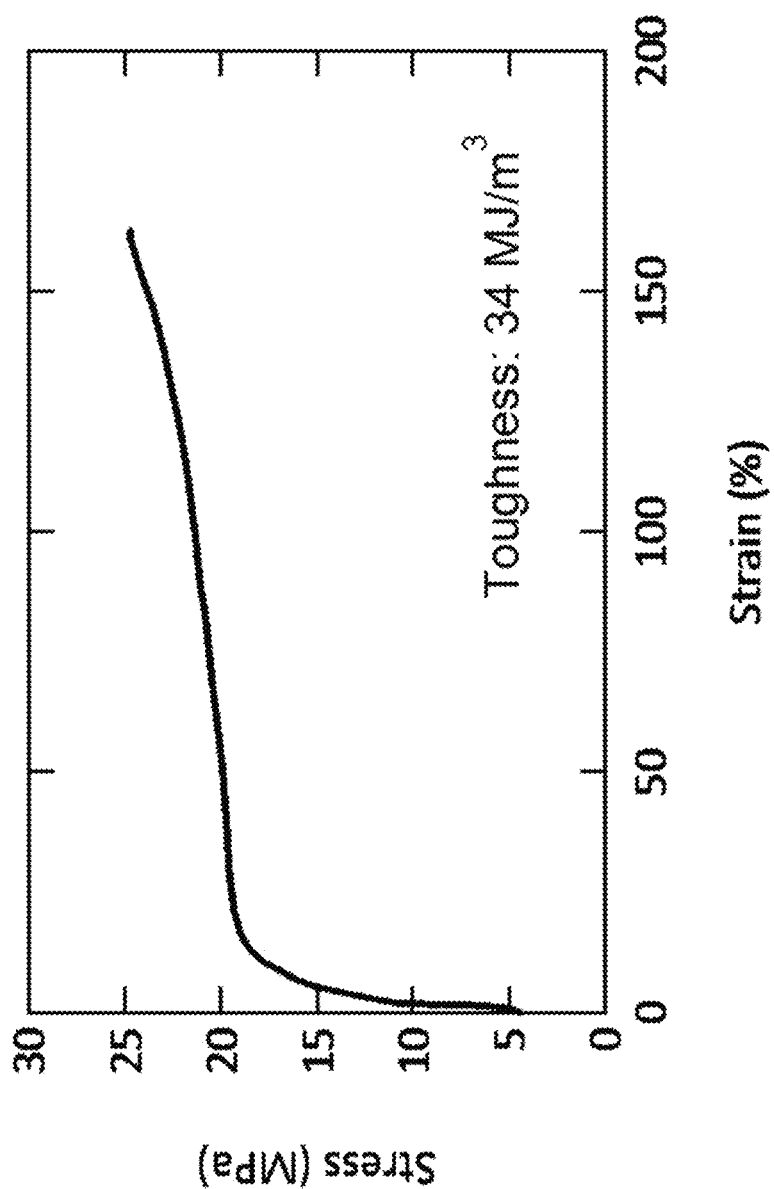

Reference is now made to the following descriptions taken in conjunction with the accompanying drawings, in which:

FIG. 1 presents a diagram of an example top-down three-dimensional stereolithography printer configured to use the vat resin of the present disclosure;

FIG. 2 illustrates by flow diagram, selected aspects of an example method of preparing a vat resin for three-dimensional stereolithography printing of a thiourethane polymer part in accordance with the principles of the present disclosure;

FIG. 3 illustrates by flow diagram, selected aspects of an example method of three-dimensional stereolithography printing a thiourethane polymer part in accordance with the principles of the present disclosure; and FIG. 4 example tensile testing results of a thiourethane polymer part formed by an embodiment of the three-dimensional stereolithography printing method and using the vat resin in accordance with the principles of the present disclosure.

DETAILED DESCRIPTION

As part of the present disclosure, we developed a vat resin additives appropriate for use in the 3D SLA printing of polythiourethane parts. Because polythiourethanes are cured using a non-nucleophilic Lewis base, free radical initiators and radical or oxygen inhibitors additives developed for use with acrylate based resins may not be appropriate for use with polythiourethane 3D SLA printing methods and systems.

As further disclosed herein, embodiments of the vat resin can include a combination of resin additives including an anionic step-growth polymerization reaction inhibitor (e.g., a cationic inhibitor) and a light absorber. These resin additives are provided in amounts to reduce or prevent polythiourethane photo-polymerization propagation in regions of the vat resin that are outside of photo-defined development areas, to thereby improve the photo-definition of the 3D SLA printed polythiourethane part.

FIG. 1 presents a diagram of an example top-down 3D SLA printer 100 configured to use a vat resin 105 of the present disclosure. As illustrated in FIG. 1, embodiments of the printer 100 can include a vat 110 for containing the resin 105 and an underlying liquid platform fluid 115, a fluid pump 120, a build table 125 with a platform 130 also located in the vat 110, and a light source 135. The liquid platform fluid 115 is denser than the resin and insoluble in the resin. Non-limiting examples of liquid platform fluids, sometimes referred to as a z-fluid, are presented in U.S. patent application Ser. No. 14/261,320 (application 320'), and hereby incorporated by reference in its entirety.

The platform 130 and the resin 105 can be positioned relative to each other in the vat 110 such that a thin layer (e.g., layer 105a) of the resin 105 is located over the platform 130. A patterned light beam 140 from the light source 135 (e.g., a laser or digital light projector) is then directed into the vat 110 to selectively cure a targeted area 142 of the thin layer 105 as part of forming a desired shape portion (e.g., a patterned layer) of the polythiourethane part 145. The part 145 is formed as part of the photo-initiated catalysis of the anionic step-growth polymerization reaction of thiol and isocyanate functionalized monomers in the targeted area of the resin 105 to form polythiourethane.

We have found, however, that for such systems of 3D SLA printing polythiourethane parts, the polymerization reaction can be undersiably propagated into non-targeted regions of the resin 105 that are outside of the target area 142 of the light beam 140, e.g., in regions of the resin 105 that are not within the thin layer 105a.

For instance, photolatent base initiator molecules present in the resin and activated by the light beam (e.g., via photodecomposition of the photolatent base molecule to form a non-nucleophillic base catalyst) can diffuse outside of the target area 142 and initiate the polymerization of monomers present in non-targeted regions of the resin 105. For instance, light can scatter from the light beam 140 to non-targeted regions of the resin 105 to thereby active initiator molecules, which in turn can initiate the polymerization of monomers in these non-targeted regions.

As part of the present disclosure we have developed vat resin embodiments that include one or both of a combination of anionic step-growth polymerization reaction inhibitor and light absorber additives to mitigate the above-described undesired propagation of the polymerization reaction.

One aspect of the disclosure is a vat resin (e.g., resin 105) for three-dimensional SLA printing of a thiourethane polymer part (e.g., part 145). Some embodiments of the resin can comprise a liquid mixture that includes a first type of monomer, a second type of monomer, and a photolatent base. The first type of monomer include two or more thiol functional groups, the second type of monomer includes two or more isocyanate functional groups. The photolatent base decomposes upon exposure to a light (e.g., light beam 140) to form a non-nucleophillic base catalyst having a pKa greater than 7. The resin further comprises an anionic step-growth polymerization reaction inhibitor having an acidic group configured to form an acid-base pair with the non-nucleophillic base. The resin also comprises a light absorber that has an absorbance in the liquid mixture that is greater than an absorbance of the photolatent base in the liquid mixture at a wavelength of the light used for the exposure.

In some embodiments, the vat resin is substantially free of water (e.g., less than 0.1 wt % or less than 0.01 wt % or less than 0.001 wt % in some embodiments). For instance anhydride or non-hydrated forms of monomers, photolatent base, inhibitor and light absorber are used in the liquid mixture of the resin.

While not limiting the scope of the disclosure by theoretic considerations, we believe that the storage lifetime of the resin can be decreased by the presence of water, possibly due to the reaction between water and isocyanate functional groups of the second type of monomer to thereby reduce the total number of isocyanate functionalized monomer available to participate in the step-growth polymerization reaction to form the polythiourethane part and may form a cyanuric acid byproduct which may degrade the polythiourethane part's structure post-cure. Additionally, we believe that one of the reaction products between the water and isocyanate functional groups may be carbamic acid, which in turn can form a cyanuric anhydride. We further believe that while cyanuric anhydride may extend the polymer chain, when the chain breaks it will release $CO_2$ which in turn may degrade the printed polymer part's structure post-cure.

In some embodiments of the resin, a mole ratio of the photolatent base to the anionic step-growth polymerization reaction inhibitor is in a range from about 5:1 to 15:1 and in some embodiments about 10:1. Such ratios are conducive to allowing the polymerization reaction to proceed in the target region (e.g., the target area 142 of layer 105a) of light illumination where the light beam (e.g., light beam 140) causes relatively high concentrations of activated non-nucleophillic base catalyst molecules (e.g., photodecomposed photolatent base molecules) and at the same time still provide enough inhibitor molecules in the non-targeted regions to form acid-base pairs with activated non-nucleophillic base catalyst molecules that have diffused out of the target region.

In some embodiments, the anionic step-growth polymerization reaction inhibitor is a strong organic acid and is non-oxidizing. That is, the inhibitor is substantially completely ionized (e.g., greater than 90% ionized and in some embodiments, greater than 99% ionized) in the liquid mixture of the resin and the inhibitor does not substantially oxidize the thiol functional groups of the first type of monomer in the liquid mixture. Using an anionic step-growth polymerization reaction inhibitor that is a strong acid facilitates the availability of acid groups that can form acid-base pairs with the activated non-nucleophillic base catalyst molecules, e.g., diffused into the non-targeted regions of the resin. Using an anionic step-growth polymerization reaction inhibitor that is non-oxidizing facilitates the storage life of the resin by maintaining the availability of thiol functional groups that can participate in the polymerization reaction.

Non-limiting example embodiments of the anionic step-growth polymerization reaction inhibitor include: octanoic acid, methanesulfonic acid, trifluoromethanesulfonic acid or carboxlic acid. For example in some embodiments, the anionic step-growth polymerization reaction inhibitor of p-toluenesulfonic acid has a concentration in the liquid mixture in a range from about 0.001 to 0.2 wt %, and in some embodiments, in a range from about 0.05 to 0.2 wt %.

In some embodiments, the light absorber in the liquid mixture has an absorbance that is at least about 1 percent higher, and in some embodiments, 5 percent higher and in some embodiment 10 percent higher and in some embodiments, 20 percent higher, than the absorbance of the photolatent base at the wavelength of the light that the resin is exposed to.

Such embodiments are conducive to the photolatent base molecules absorbing enough of the light and thereby be activated non-nucleophillic base catalyst molecules in the target area to catalyze the polymerization reaction and at the same time still permit the light absorber to absorb light scattered into the non-target areas of the resin and thereby reduce the amount light available to activate the photolatent base molecules in the non-target areas.

In some embodiments the light absorber has a high molar extinction coefficient at the wavelength used to activate the photolatent base (e.g., at least about 10000 $M^{-1}$ $cm^{-1}$). Having a high molar extinction coefficient is conducive to using low (e.g., millimolar or lower concentrations) of the light absorber in the fluid mixture of the resin, which in turn is conducive to having the light absorber fully dissolve in the mixture, e.g., to mitigate light scattering effects from partially precipitated light absorbers.

Consider an example where the light absorber is or includes 2,2'-(2,5-thiophenediyl)bis(5-tert-butylbenzoxazole (molar extinction coefficient equal to about 47000 $M^{-1}$ $cm^{-1}$ at about 373 nm) with a concentration in the fluid mixture that is in a range from about 0.001 to 1 wt %. At a concentration of about 1 wt % (e.g., about 23 mM) the absorbance in the fluid mixture would equal about 1080. At a fluid concentration of about 0.01 wt % (e.g., about 0.23 mM) the absorbance in the fluid mixture would equal about 10.8 and at a fluid concentration of about 0.001 wt % (e.g., about 0.023 mM) the absorbance in the fluid mixture would equal about 1.08

Based on the present disclosure one skilled in the pertinent art would appreciate that the light absorber could be molecules selected have a sufficiently high molar extinction coefficient in the UV or in the visible light range to be soluble in the fluid mixture and have an absorbance that is greater than the absorbance of the photolatent base and the wavelength of light that is used to activate the photolatent base.

In some embodiments of the resin, the photolatent base is or includes 5-(2'-(methyl)thioxanthone)-1,5-diazabicyclo [4.3.0]non-5-ene tetraphenylborate. Other non-limiting examples of other photolatent bases, are presented in U.S. patent application Ser. No. 15/458,220 (application 220'), and hereby incorporated by reference in its entirety.

In some embodiments, the first type of monomer in the resin is or includes one of more of: 2,2'-(ethylenedioxy) diethanethiol, decanedithiol, hexanedithiol, glycol dimercaptoacetate, glycol dimercaptopropionate, thiobisbenzenethiol, xylene dithiol, pentaerythritol tetramercaptoacetate, pentaerythritol tetramercaptopropionate, dipentaerythritol hexamercaptopropionate, trimethylolpropane trimercaptoacetate, trimethylolpropane trimercaptoacetate, or tris[2-(3-mercaptopropionyloxy)ethyl]isocyanurate.

In some embodiments, the second type of monomer in the resin is or includes one of more of: hexamethylene diisocyanate, trimethylhexamethylene diisocyanate, diisocyanatooctane, isophorone diisocyanate, xylene diisocyanate, toluene diisocyanate, phenylene diisocyanate, bis(isocyanatomethyl)cyclohexane, 4,4'-methylenebis(phenyl isocyanate), 4,4'-methylenebis(cyclohexyl isocyanate), or tris(6-isocyanatohexyl)isocyanurate.

Other non-limiting examples of other first and second type monomers are presented in the application 220'.

Based upon the present disclosure one skilled in the pertinent arts would appreciate that the amounts of inhibitor and light absorber present in the resin would depend upon the on the amount of the photolatent base initiator present in the resin as well as the absorbance of the photolatent base at the wavelength of light beam used to activate the photolatent base exposure to form the non-nucleophillic base catalyst.

Another aspect of the disclosure is a method of preparing a vat resin for 3D SLA printing a thiourethane polymer part. FIG. 2 illustrates by flow diagram, selected aspects of an example method 200 of preparing the vat resin in accordance with the principles of the present disclosure.

With continuing reference to FIG. 2 throughout, some embodiments of the method 200 can comprise forming a liquid mixture (step 205). Forming the liquid mixture (step 205) includes combining a first type of monomer and a second type of monomer to form a monomer mixture (step 210). Any combination of the first and second types of monomers disclosed herein could be mixed together to form a homogenous monomer mixture. For example, the first type of monomer can include two or more thiol functional groups and the second type of monomer can include two or more isocyanate functional groups.

Forming the liquid mixture (step 205) also includes adding an anionic step-growth polymerization reaction inhibitor to the monomer mixture (step 215), e.g., any anionic step-growth polymerization reaction inhibitor that has an acidic group configured to form an acid-base pair with the non-nucleophillic base.

Forming the liquid mixture (step 205) also includes adding a photolatent base to the monomer mixture (step 220), e.g., any disclosed photolatent base that decomposes upon exposure to a light to form a non-nucleophillic base catalyst having a pKa greater than 7.

Forming the liquid mixture (step 205) also includes adding a light absorber to the monomer mixture (step 225), e.g., any light absorber that in the liquid mixture that will have an absorbance that is greater than an absorbance of the photolatent base at a wavelength of the light used for the exposure.

Embodiments of the method 200 can include any combination of sequential additions of the anionic step-growth polymerization reaction inhibitor, the photolatent base and the light absorber to the monomer mixture, or, adding any two or all three of these to the monomer mixture simultaneously to form a homogenous liquid mixture.

Still another aspect of the disclosure is a method of three-dimensional stereolithography printing a thiourethane polymer part. FIG. 3 illustrates by flow diagram, selected aspects of an example method 300 of three-dimensional stereolithography printing a thiourethane polymer part in accordance with the principles of the present disclosure With continuing reference to FIGS. 1 and 3 throughout, some embodiments of the method 300 can comprise adding a resin 105 to a vat 110 of a three-dimensional stereolithography printer 100 (step 305). The resin 105 can comprise any of the embodiments of the liquid mixture including the first type of monomer, the second type of monomer, the photolatent base, the anionic step-growth polymerization reaction inhibitor and the light absorber disclosed herein.

Embodiments of the method 300 can also comprise positioning (step 310) the resin 105 or a platform 130 of a build table 125 located in the vat 110 such that a thin layer 105a of the resin 105 is located over the platform 130.

In some embodiments, as part of positioning (step 310), the build table 125 can be moved to flow a thin layer of the resin (e.g., layer 105a of thickness 100 to 500 microns) on top of a previously cured layer of the part 145 (e.g., layer 145a). In other embodiments, as part of positioning (step 310), the amount of liquid platform 115 in the vat 110 can be increased by adding liquid platform 115 to the vat 110 via the pump 120 (e.g., a syringe or peristaltic pump) raise the level of resin in the vat and thereby to flow a thin layer of the resin 105a on top of the previously cured layer 145a. In some embodiments a portion of the liquid platform 115 can be subtracted from the vat 110 via the pump 120 to lower the level of the resin 105 in the vat 110 but leave the thin layer of resin 105a on top of the previously cured layer 145a.

In yet other embodiments, as part of positioning (step 310), the light source 135 can be moved and/or the focal plane of the projected light bean 140 can be adjusted such that only the thin layer 105a of the resin 105 is exposed to the light beam 140 (step 312).

Embodiments of the method 300 can also comprise exposing (step 315) a target area 142 of the thin layer 105a to a beam of the light 140, the light having a pattern corresponding to one cross-section of the thiourethane polymer part such that the photolatent base in the light exposed target area of the resin decomposes to form the non-nucleophillic base catalyst and thereby catalyzes polymerization of the first and second types of monomer together to form a patterned layer the thiourethane polymer part 145.

In embodiments of the method 300, the inhibitor and light absorber additives in the resin 105 can substantially prevent the polymerization of the first and second types of monomer in areas of the resin lying outside of the target area 142.

Based on the present disclosure one skilled in the pertinent arts would understand how the process of selectively exposing target areas 142 of successive thin layers (e.g., layer 105a) of resin 105 to the light beam 140 can be repeated until the final three-dimensional part 145 is formed. The part 145 is then removed from the vat 110, cleaned, and post-cured.

Experiments

To illustrate various features of the disclosure, the 3D SLA printing of an example polythiourethane part was tested using an embodiment of the vat resin and an embodiment of the method of printing in accordance with disclosure.

3D SLA printing was performed using a B9 Creator, Formlabs Form 2, Somerville, Mass.) and Carbon M1 digital light projector adjusted to emit a light bean at 385 nm.

Type one and type two monomers 2,2'-(ethylenedioxy) diethanethiol, and hexamethylene diisocyanate, and tris(6-isocyanatohexyl)isocyanurate, respectively, were mixed with a photolatent base of 5-(2'-(methyl)thioxanthone)-1,5-diazabicyclo[4.3.0]non-5-ene tetraphenylborate, a reaction anionic step-growth polymerization reaction inhibitor of p-toluenesulfonic acid hydrate, and a light absorber (e.g., UV light absorber) of 2,2'-(2,5-thiophenediyl)bis(5-tert-butylbenzoxazole) until a homogenous liquid mixture was obtained.

In various embodiments of the resin, the amount of the isocyanate functional groups that was contributed by tris(6-isocyanatohexyl)isocyanurate was in a range from about 5% and about 100% of the isocyanate functional groups, with the remainder of isocyanate functional groups contributed from hexamethylene diisocyanate. The amount of photolatent base used was in a range from about 0.1 wt % to about 1 wt % of the total monomer mass. The amount of inhibitor used was in a range from about 0% wt % and about 0.1 wt %. The amount of light absorber used was in a range from about 0.01 wt % to about 0.5 wt % of UV absorber used.

Following printing, the part was removed from the build plate and washed with hexanes before undergoing UV post-curing for one hour at 85° C.

Tensile testing of embodiments of such print parts was performed to demonstrate that the printed parts have a have high toughness in tension (see e.g., FIG. 4).

Those skilled in the art to which this application relates will appreciate that other and further additions, deletions, substitutions and modifications may be made to the described embodiments.

What is claimed is:

1. A vat resin for three-dimensional stereolithography printing of a thiourethane polymer part comprising:
   a liquid mixture including:
      a first type of monomer including two or more thiol functional groups,
      a second type of monomer including two or more isocyanate functional groups,
      a photolatent base, wherein the photolatent base is decomposable upon exposure to a light to form a non-nucleophillic base catalyst having a pKa greater than 7;
      an anionic step-growth polymerization reaction inhibitor, the inhibitor having an acidic group configured to form an acid-base pair with the non-nucleophillic base; and
      a light absorber having an absorbance in the liquid mixture that is greater than an absorbance of the photolatent base at a wavelength of the light used for the exposure.

2. The vat resin of claim 1, wherein the vat resin is substantially free of water.

3. The vat resin of claim 1, wherein a mole ratio of the photolatent base to the anionic step-growth polymerization reaction inhibitor is in a range from about 5:1 to 15:1.

4. The vat resin of claim 1, wherein the anionic step-growth polymerization reaction inhibitor is a strong organic acid and is non-oxidizing with respect to oxidize the thiol functional groups of the first type of monomer in the liquid mixture.

5. The vat resin of claim 1, wherein the anionic step-growth polymerization reaction inhibitor includes one or more of octanoic acid, methanesulfonic acid, trifluoromethanesulfonic acid or carboxlic acid.

6. The vat resin of claim 1, wherein the anionic step-growth polymerization reaction inhibitor includes p-toluenesulfonic acid has a concentration in the liquid mixture in a range from about 0.001 to 0.2 wt %.

7. The vat resin of claim 1, wherein the light absorber in the liquid mixture has an absorbance that is at least about 1 percent higher than the absorbance of the photolatent base at the wavelength of the light that the vat resin is exposed to.

8. The vat resin of claim 1, wherein the light absorber in the liquid mixture has molar extinction coefficient of at least about 10000 $M^{-1}$ $cm^{-1}$ at the wavelength used to activate the photolatent base.

9. The vat resin of claim 1, wherein the light absorber in the liquid mixture has a concentration of 1 mM or less and an absorbance of at least about 1 at a wavelength of the light used for the exposure.

10. The vat resin of claim 1, wherein the light absorber in the liquid mixture has a concentration that is in a range from about 0.001 to 1 wt %.

11. The vat resin of claim 1, wherein the light absorber in the liquid mixture includes 2,2'-(2,5-thiophenediyl)bis(5-tert-butylbenzoxazole).

12. The vat resin of claim 1, wherein the photolatent base is or includes 5-(2'-(methyl)thioxanthone)-1,5-diazabicyclo[4.3.0]non-5-ene tetraphenylborate.

13. The vat resin of claim 1, wherein first type of monomer includes one of more of: 2,2'-(ethylenedioxy) diethanethiol, decanedithiol, hexanedithiol, glycol dimercaptoacetate, glycol dimercaptopropionate, thiobisbenzenethiol, xylene dithiol, pentaerythritol tetramercaptoacetate, pentaerythritol tetramercaptopropionate, dipentaerythritol hexamercaptopropionate, trimethylolpropane trimercaptoacetate, trimethylolpropane trimercaptoacetate, or tris[2-(3-mercaptopropionyloxy)ethyl] isocyanurate.

14. The vat resin of claim 1, wherein second type of monomer includes one of more of: hexamethylene diisocyanate, trimethylhexamethylene diisocyanate, diisocyanatooctane, isophorone diisocyanate, xylene diisocyanate, toluene diisocyanate, phenylene diisocyanate, bis(isocyanatomethyl)cyclohexane, 4,4'-methylenebis(phenyl isocyanate), 4,4'-methylenebis(cyclohexyl isocyanate), or tris(6-isocyanatohexyl)isocyanurate.

15. The vat resin of claim 1, wherein the light absorber in the liquid mixture has an absorbance in a range of about 5 to 10 percent higher than the absorbance of the photolatent base at the wavelength of the light that the vat resin is exposed to.

16. The vat resin of claim 1, wherein the light absorber in the liquid mixture has an absorbance in a range of about 10 to 20 percent higher than the absorbance of the photolatent base at the wavelength of the light that the vat resin is exposed to.

* * * * *